United States Patent [19]

Yuasa et al.

[11] 4,447,821
[45] May 8, 1984

[54] METHOD AND APPARATUS OF ELECTROSTATIC RECORDING

[75] Inventors: Kazuhiro Yuasa, Zama; Noboru Furukawa, Atsugi, both of Japan

[73] Assignee: Ricoh Company, Ltd., Japan

[21] Appl. No.: 399,005

[22] Filed: Jul. 16, 1982

[30] Foreign Application Priority Data

Jul. 17, 1981 [JP] Japan .................. 56-112001

[51] Int. Cl.³ .......................... G01D 15/06
[52] U.S. Cl. ................................ 346/154
[58] Field of Search ............. 346/154, 155; 358/300

[56] References Cited

U.S. PATENT DOCUMENTS 4,297,715 10/1981 Tadauchi et al. ............... 346/154

FOREIGN PATENT DOCUMENTS 107209 8/1979 Japan .................. 346/154

Primary Examiner—Thomas H. Tarcza
Attorney, Agent, or Firm—Guy W. Shoup

[57] ABSTRACT

A method and apparatus for forming an electrostatic latent image free of phantoms is provided. A recording medium is first uniformly charged and the charges are selectively dissipated by the recording unit including a plurality of styluses to which a recording potential is selectively applied and auxiliary electrodes to which an auxiliary potential is applied to form an electrostatic latent image on the medium. The present invention is characterized by applying a bias potential, preferably equal to or substantially equal to the surface potential of the charged medium, to the styluses and auxiliary electrodes thereby allowing to prevent unwanted recording from occurring.

8 Claims, 6 Drawing Figures

METHOD AND APPARATUS OF ELECTROSTATIC RECORDING

BACKGROUND OF THE INVENTION

1. Field of the Invention

This invention relates to a method and apparatus of electrostatic recording and in particular to a transfer type electrostatic recording method and apparatus.

2. Description of the Prior Art

A multi-stylus type electrostatic recording system is schematically shown in FIG. 1. As shown, a plurality of recording styluses $2ij$ ($i=1\sim n$, $j=1\sim m$) are arranged in the form of a single array extending in the direction perpendicular to the recording medium advancing direction A. These recording styluses $2ij$ are grouped into blocks, i.e., n blocks in the example shown, and each block has the same number of recording styluses, i.e., m styluses in each block in the example shown. Corresponding recording styluses in respective blocks are commonly connected and they are also connected to a driving circuit B to which block-by-block information to be recorded is supplied. For each block of recording styluses is provided a pair of auxiliary electrodes 3, which are commonly connected. A switch S is connected between a voltage source (not shown) and the corresponding pair of auxiliary electrodes 3.

In operation, a series of bit information is stored into the driving circuit B, which is then applied to the corresponding recording styluses, and, at the same time, the switch $S_1$ is turned on to apply a predetermined voltage to the auxiliary electrodes $3_1$ of the first block. Then, another series of bit information is stored in the driving circuit B, which is then applied to the corresponding recording styluses, and, at the same time, the switch $S_2$ is turned on to apply a predetermined voltage to the auxiliary electrodes $3_2$ of the second block. In this manner, each block is sequentially operated from left to right in FIG. 1. Such a block formation is advantageous because the driving circuit B may be commonly used and the wiring is relatively simplified.

As shown in FIG. 2, the recording stylus 2 is supported by a recording unit 6 as electrically isolated therefrom, and a recording signal $V_{sty}$ is applied to the stylus 2. The auxiliary electrodes 3 are also supported by the recording unit 6 as electrically isolated therefrom, and a block signal $V_{seg}$ is applied thereto. The recording medium 1 includes a dielectric layer 11 which is formed on a conductive layer 12, which, in turn, is formed on a base layer 13, and the conductive layer 12 is grounded.

In the above-described electrostatic recording system, since the auxiliary electrodes 3 are provided and a predetermined voltage $V_{seg}$ of the polarity opposite to that of the recording signal $V_{sty}$ is applied thereto, the level of the recording signal $V_{sty}$ may be relatively low thereby allowing to use a relatively low voltage driver. When the above-described structure is applied to the transfer type recording system, in which a toner image formed on the recording medium 1 is transferred to plain paper thereby allowing to use the recording medium repetitively, residual charges remaining on the recording medium 1 after transfer must be removed. Under the circumstances, since it is extremely difficult to completely remove such residual charges to neutralize the surface potential of the recording medium 1, it is typically so structured that the recording medium 1 is first uniformly charged by a corona discharging device to make the surface potential uniform and then the charges thus deposited on the recording medium 1 are selectively removed by the discharge between the selected styluses 2 and the auxiliary electrodes 3 to form an electrostatic latent image, which is then developed to be converted into a toner image.

In the electrostatic recording system as described above, denoting the surface potential of the recording medium 1 when uniformly charged to be $V_S$, the negative voltage to be applied to the styluses 2 at the time of recording to be $V_{sty}$, and the positive voltage to be applied to the auxiliary electrodes 3 at the time of recording to be $V_{seg}$, then the voltage existing between the selected styluses 2 and the recording medium 1 at the time of recording may be substantially given by the following equation.

$$V_{gap} = \frac{(V_S - V_{sty}) \cdot g}{g + \frac{d_m}{\epsilon_m}} \cong V_S - V_{sty} \tag{1}$$

$$\therefore g >> \frac{d_m}{\epsilon_m}$$

where g is the gap distance between the stylus 2 and the recording medium 1, $d_m$ is the thickness of the dielectric layer 11, and $\epsilon_m$ is the dielectric constant of the dielectric layer 11. The relationship between $V_S$, $V_{seg}$ and $V_{sty}$ is shown in FIG. 3.

In the above equation (1), since $V_S$ is positive and $V_{sty}$ is negative, $V_{gap}$ is simply an algebraic sum of these two values. Thus, if the value of $V_{gap}$ exceeds the discharge on-set voltage, then discharge will also take place between the selected styluses 2 and the recording medium 1 even in the unselected blocks, thereby forming a phantom image. For example, in the recording system shown in FIG. 1, even if only the switch $S_1$ is turned on to apply $V_{seg}$ to the auxiliary electrodes $3_1$ of the leftmost block, the signal $V_{sty}$ is equally applied to the corresponding styluses, e.g., $2_{11}, 2_{21}, 2_{31}, \ldots$ and $2_{n1}$, in all of the blocks; consequently, writing will be carried out not only by the stylus $2_{11}$, which is wanted, but also by the corresponding styluses $2_{21}$ through $2_{n1}$, which are not wanted. It should also be noted that the level of $V_S$ may charge depending upon the condition, e.g., moisture content, of the recording medium 1.

SUMMARY OF THE INVENTION

It is therefore an object of the present invention to provide an improved electrostatic recording method and apparatus.

Another object of the present invention is to provide an electrostatic recording method and apparatus capable of being operated by a relatively low driving voltage.

A further object of the present invention is to provide an electrostatic recording method and apparatus simple in structure and easy to manufacture.

A still further object of the present invention is to provide an electrostatic recording method and apparatus capable of preventing a phantom image from being produced.

A still further object of the present invention is to provide a transfer type electrostatic recording method and apparatus capable of providing images of excellent quality in a continuous manner.

In accordance with one aspect of the present invention, there is provided an electrostatic recording apparatus for forming an electrostatic latent image on the surface of a uniformly charged recording medium which is moved relative to the apparatus and includes a surface dielectric layer formed on an electrically conductive layer which is connected to a reference potential, said apparatus comprising: a plurality of recording styluses arranged in the form of an array extending in the direction perpendicular to the direction of relative motion between said apparatus and said medium; auxiliary electrode means disposed in the vicinity of said recording styluses; means for applying recording signals of the polarity opposite to that of the uniform charges of said recording medium to said recording styluses; means for applying a predetermined voltage of the polarity same as that of the uniform charges of said recording medium to said auxiliary electrode means; and means for applying a bias voltage of the polarity same as that of the uniform charges of said recording medium to said plurality of recording styluses and said auxiliary electrode means.

In accordance with another aspect of the present invention, there is provided an electrostatic recording method for forming an electrostatic latent image on the surface of a recording medium including a surface dielectric layer formed on an electrically conductive layer which is connected to a reference potential by causing discharge between selected ones of a plurality of recording styluses and auxiliary electrode means disposed in the vicinity of said styluses, said method comprising the steps of: uniformly charging said recording medium to a first polarity; and applying a first potential of the polarity opposite to said first polarity to said selected ones of said plurality of recording styluses and at the same time a second potential of the polarity same as said first polarity to said auxiliary electrode means and simultaneously therewith applying a third potential of the polarity same as said first polarity as a bias potential to said selected ones of said plurality of recording styluses and to said auxiliary electrode means.

Other objects, advantages and novel features of the present invention will become apparent from the following detailed description of the invention when considered in conjunction with the accompanying drawings.

DESCRIPTION OF THE PREFERRED EMBODIMENTS

Figure 4:
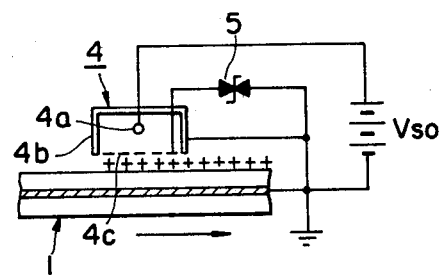
FIG. 4 is a schematic illustration showing one example of a charging device for charging the surface of the recording medium 1 uniformly.

FIG. 4 shows a typical charging device 4 for charging the surface of the recording medium 1, which moves in the direction indicated by the arrow, to a desired surface potential. The charging device 4 is a so-called Scorotron charger and it comprises a corona wire 4a to which a high voltage $V_{SO}$ is applied and a conductive shield 4b which partly surrounds the corona wire 4a to define an opening and is connected to ground. The charging device 4 further comprises a grid 4c disposed at the opening defined by the shield 4b, and a varistor 5 is connected between the shield 4b and ground so that the grid potential is maintained at constant thereby controlling the surface potential of the charged recording medium 1 to a desired value $V_S$. It is to be noted that a separate voltage source for the grid 4c may be provided instead of the varistor 5.

Figure 1:
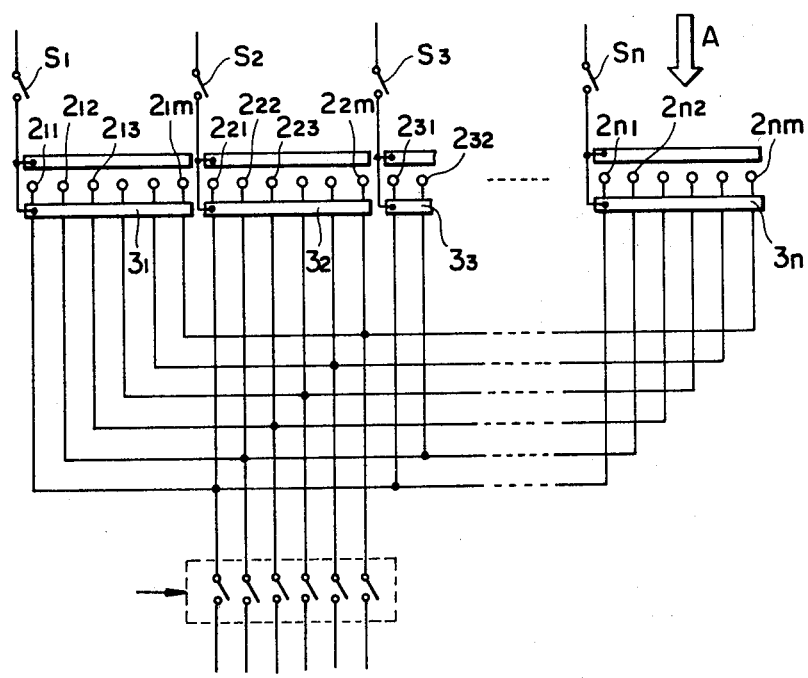
FIG. 1 is a schematic illustration showing a multi-stylus electrostatic recording system to which the present invention is to be applied.
Figure 2:
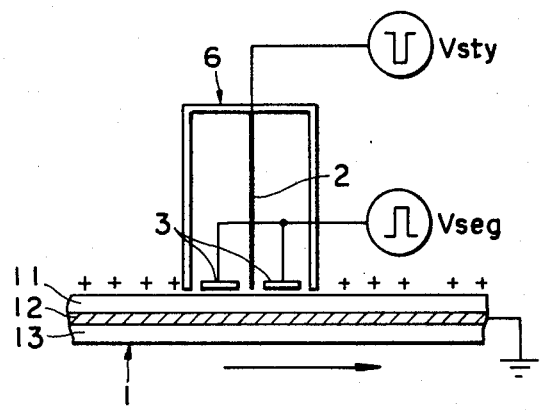
FIG. 2 is a schematic illustration showing the structure of the recording apparatus used in the system of FIG. 1.
Figure 3:
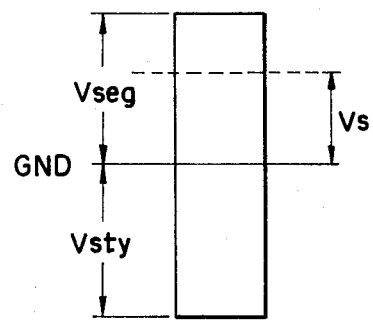
FIG. 3 is a graph showing the relationship between potential $V_{seg}$ to be applied to the auxiliary electrode 3, potential $V_{sty}$ to be applied to the stylus 2 and surface potential $V_S$ of the recording medium 1 in FIG. 2.
Figure 5:
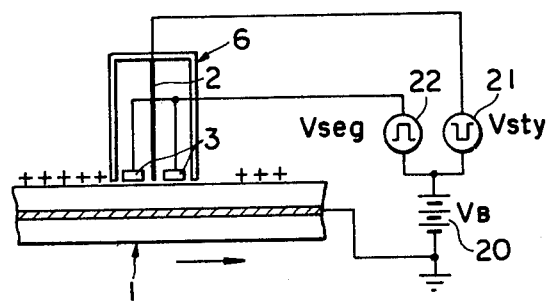
FIG. 5 is a schematic illustration showing one embodiment of the present invention.

Referring now to FIG. 5, there is shown one embodiment of the present electrostatic recording apparatus which is structurally similar to that of FIG. 2 excepting that an additional voltage source 20 for supplying a bias potential $V_B$ is provided. That is, a plurality of recording styluses are arranged in a single array extending in the direction normal to the drawing paper or in the direction perpendicular to the travelling direction of the recording medium 1 as indicated by the arrow. The recording styluses 2 are so disposed with their bottom ends pointed toward the surface of the recording medium 1 with a predetermined gap therebetween. A pair of auxiliary electrodes 3 is provided in the vicinity of the bottom ends of the recording styluses 2, and the distance between the recording styluses 2 and the auxiliary electrodes 3 is appropriately determined such that discharge can take place when required.

Figure 6:
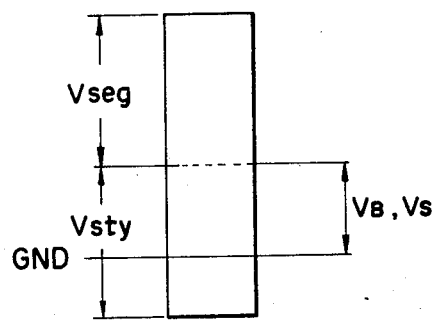
FIG. 6 is a graph similar to FIG. 3 but when bias potential $V_B$ is applied as shown in FIG. 5.

A signal source 21 is connected between the bias voltage source 20 and the recording styluses 2 are shown. Thus, the recording potential $V_{sty}$ is shifted by the amount of positive bias potential $V_B$. On the other hand, an auxiliary voltage source 22 is connected between the bias voltage source 20 and the auxiliary electrodes 3 as shown. Accordingly, when the auxiliary potential $V_{seg}$ is applied, it is shifted by the positive bias potential $V_B$. Preferably, such a bias potential $V_B$ is equal to or substantially equal to the surface potential $V_S$ of the recording medium 1 when uniformly charged. The relative relationship among $V_{seg}$, $V_{sty}$, $V_B$ and $V_S$ under the circumstances is shown in FIG. 6.

Thus, when the recording signals $V_{sty}$ are selectively applied to the styluses 2 while the auxiliary potential $V_{seg}$ is applied to the auxiliary electrodes 3, since the sum of $V_{sty}$ and $V_{seg}$ is large enough to cause discharge between the selected styluses 2 and the auxiliary electrodes 3, the charges deposited on the recording medium 1 are selectively removed to form an electrostatic latent image. And, the thus formed latent image may be developed by any conventional technique such as by supplying oppositely charged toner particles. Then, the toner image may be transferred to plain paper by any conventional technique. Thereafter, the surface of the medium 1 is cleaned to remove residual toner particles, thereby allowing to present the medium for the next image forming operation.

It should be noted that, in a preferred embodiment, since the bias potential $V_B$ which is same both in magnitude and in polarity as the surface potential $V_S$ of the uniformly charged recording medium 1 is applied to the styluses 2 and the auxiliary electrodes 3, no voltage difference exists between the recording unit 6 and the medium 1. Under the condition, when $V_{seg}$ is applied to the auxiliary electrodes 3, a voltage difference between the auxiliary electrodes and the medium or between the auxiliary electrodes and the styluses 2 remains $V_{seg}$, which is not large enough to cause discharge anywhere thereby unwanted recording may be prevented from occurring. Therefore, discharge can take place between the selected styluses 2 and the auxiliary electrode 3 only when the recording signal $V_{sty}$ is applied to the selected styluses 2.

Described differently, in the apparatus shown in FIG. 5, denoting the voltage difference between the selected styluses 2 and the medium 1 by $V'_{gap}$, it can be expressed by the following equation.

$$V'_{gap} = \frac{(V_S - V_B - V_{sty}) \cdot g}{g + \frac{d_m}{\epsilon_m}} \simeq -V_{sty} \quad (2)$$

The above equation indicates that the gap potential is significantly reduced in the present invention and no discharge will take place between the selected styluses 2 and the charged medium 1 unless the auxiliary potential $V_{seg}$ is applied to the auxiliary electrodes 3. It will be easily appreciated by those shield in the art that it is preferable to set $V_{seg}$ and $V_{sty}$ such that they are same in magnitude but opposite in polarity.

Next, a description will be made as to the allowable range for the bias potential $V_B$. If the bias potential $V_B$ is set lower than the surface potential $V_S$ of the charged recording medium 1, discharge tends to take place between the selected styluses 2 and the medium 1; whereas, if the bias potential $V_B$ is set higher than the surface potential $V_S$ of the charged recording medium 1, discharge tends to take place between the auxiliary electrodes 3 and the medium 1. In order to prevent unwanted recording from occurring, these two gap potentials must be held smaller than the discharge onset voltage $V_D$. That is, for the gap potential below the selected styluses 2, $$V'_{gap1} = \frac{(V_S - V_B - V_{sty}) \cdot g}{g + \frac{d_m}{\epsilon_m}} \simeq V_S - V_B - V_{sty} < V_D \quad (3)$$

and, for the gap potential below the auxiliary electrodes 3, $$V'_{gap2} = \frac{(V_B - V_S + V_{seg}) \cdot g}{g + \frac{d_m}{\epsilon_m}} \simeq V_B - V_S + V_{seg} < V_D \quad (4)$$

From the above equation, the allowable range for the bias potential $V_B$ can be determined as follows:

$$-V_D + V_S - V_{sty} < V_B < V_D - V_{seg} + V_S \quad (5)$$

For example, it typically holds that $V_D = 400$ V, $V_{sty} = -350$ V and $V_{seg} = 350$ V. In this case, the bias potential may be determined to satisfy the condition $V_S - 50 < V_B < V_S + 50$.

As described in detail above, in accordance with the present invention, a recording medium including a conductive layer is uniformly charged and then the thus deposited charges are selectively removed by applying a first potential having a first polarity to the selected styluses and a second potential having a second polarity opposite to said first polarity to the auxiliary electrodes thereby forming an electrostatic latent image on the medium, whereby the present invention is characterized by superposing a bias potential, which is equal to or substantially equal to the surface potential of the uniformly charged medium, to the first and second potentials, thereby insuring that discharge for recording takes place only at the selected ones among a plurality of styluses arranged in the form of an array. Thus, the present invention allows to prevent discharge for recording from occurring at non-selected styluses, which, in turn, contributes to obtain an excellent quality image free of phantoms.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. An electrostatic recording apparatus for forming an electrostatic latent image on the surface of a uniformly charged recording medium which is moved relative to said apparatus and includes a surface dielectric layer formed on an electrically conductive layer which is connected to a reference potential, said apparatus comprising:
   a plurality of recording styluses arranged in the form of an array extending in the direction perpendicular to the direction of relative motion between said apparatus and said medium;
   auxiliary electrodes means disposed in the vicinity of said recording styluses;
   means for applying recording signals of the polarity opposite to that of the uniform charges of said recording medium to said recording styluses;
   means for applying a predetermined voltage of the polarity same as that of the uniform charges of said recording medium to said auxiliary electrode means; and
   means for applying a bias voltage of the polarity same as that of the uniform charges of said recording medium to said plurality of recording styluses and said auxiliary electrode means.

2. The apparatus of claim 1 wherein said bias voltage is substantially equal in magnitude to the surface potential of said uniformly charged recording medium.

3. The apparatus of claim 1 or 2 wherein said reference potential is the ground potential.

4. The apparatus of claim 1 or 2 wherein said predetermined voltage applied to said auxiliary electrodes means is same in magnitude with but opposite in polarity to said recording signals applied to said recording styluses.

5. The apparatus of claim 1 wherein said auxiliary electrode means includes a plurality of electrode segments to which said predetermined voltage is applied in sequence and said plurality of recording styluses are grouped into blocks, each block including a predetermined number of said recording styluses and being provided with one of said electrode segments and the corresponding styluses in the respective blocks being commonly connected thereby the recording signals are commonly applied to the corresponding styluses.

6. An electrostatic recording method for forming an electrostatic latent image on the surface of a recording medium including a surface dielectric layer formed on an electrically conductive layer which is connected to a reference potential by causing discharge between selected ones of a plurality of recording styluses and auxiliary electrode means disposed in the vicinity of said styluses, said method comprising the steps of:

uniformly charging said recording medium to a first polarity; and applying a first potential of the polarity opposite to said first polarity to said selected ones of said plurality of recording styluses and at the same time a second potential of the polarity same as said first polarity to said auxiliary electrode means and simultaneously therewith applying a third potential of the polarity same as said first polarity as a bias potential to said selected ones of said plurality of recording styluses and to said auxiliary electrode means.

7. The method of claim 6 wherein said third potential is substantially same in magnitude with the surface potential of said recording medium when charged uniformly.

8. The method of claim 7 or 8 wherein said first and second potentials are same in magnitude but opposite in polarity.

* * * * *